US008583573B1

(12) United States Patent
Smith et al.

(10) Patent No.: US 8,583,573 B1
(45) Date of Patent: Nov. 12, 2013

(54) NONPARAMETRIC MINE LINE DETECTION USING SPATIAL ANALYSIS

(75) Inventors: Cheryl M. Smith, Panama City, FL (US); John C. Hyland, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 536 days.

(21) Appl. No.: 12/925,396

(22) Filed: Oct. 19, 2010

(51) Int. Cl.
*G06F 15/18* (2006.01)
*G06F 17/00* (2006.01)
*G06N 5/02* (2006.01)

(52) U.S. Cl.
USPC ................................... 706/14; 706/47; 706/1

(58) Field of Classification Search
None
See application file for complete search history.

(56) References Cited

U.S. PATENT DOCUMENTS

2011/0241930 A1* 10/2011 Wood et al. ..................... 342/93

OTHER PUBLICATIONS

D. Walsh and A. E. Raftery. Detecting Mines in Minefields with Linear Characteristics. Technical Report No. 359, Department of Statistics, University of Washington, 1999.*
Rachlin, Y.; Dolan, J.M.; Khosla, P., "Efficient mapping through exploitation of spatial dependencies," Intelligent Robots and Systems, 2005. (IROS 2005). 2005 IEEE/RSJ International Conference on , vol., no., pp. 3117-3122, Aug. 2-6, 2005.*
Zhang, Y.; Schervish, M.; Choset, H., "Probabilistic hierarchical spatial model for mine locations and its application in robotic landmine search," Intelligent Robots and Systems, 2002. IEEE/RSJ International Conference on , vol. 1, no., pp. 681-689 vol. 1, 2002.*
A. Dasgupta and A. Raftery, "Detecting features in spatial point processes with cluster via model-based clustering," J. Amer. Statist. Assoc., vol. 93, No. 441, pp. 294-302, 1998.*
N.A.C. Cressie and L.B. Collins. Patterns in spatial point locations: local indicators of spatial association in a minefield with clutter. Naval Research Logistics, 48:333-347, 2001.*
Muise, R., and Smith, C. (1992), "Nonparametric Minefield Detection and Localization," Technical Report CSS-TM-591-91, Coastal Systems Station, Panama City, FL.*

* cited by examiner

*Primary Examiner* — Kakali Chaki
*Assistant Examiner* — Daniel Pellett
(74) *Attorney, Agent, or Firm* — James T. Shepherd

(57) ABSTRACT

A mine line detection method to identify mine-like contacts (MLCs) that fit into mine line patterns dictated by standard mine laying protocol. In general, MLCs define a minefield where the minefield has both mines and false alarms. The method classifies every MLC into one of three classes: fixed—a mine line pattern with fixed mine spacing; random—a mine line pattern with random mine spacing; or false alarm—the MLC does not fit into a mine line pattern and is not considered a mine. The method requires no knowledge of either the sensor probability of detection ($P_d$) or probability of false alarm ($P_{fa}$); nonetheless, it significantly improves both. A nonparametric anomaly detector identifies regions with unusually high MLC density for more detailed analysis. Suspected regions are analyzed for unusually regular patterns of MLCs. Probabilities that the observed target densities and target patterns could occur by chance are estimated.

18 Claims, 12 Drawing Sheets

TABLE I
SPECIFIC MINEFIELD PARAMETERS BY DEPTH

| Parameter | Depth | | |
|---|---|---|---|
| | < 40 ft. | Between 40 and 100 ft. | Between 100 and 200 ft |
| Maximum No. of Lines | 200 | 200 | 200 |
| Maximum Line Length (meters) | 3700 | 5000 | 8000 |
| Minimum No. of Cells | 5 | 5 | 5 |
| Minimum Mine Spacing (meters) | 20 | 70 | 150 |
| Maximum Mine Spacing (meters) | 110 | 300 | 610 |
| Std. Deviation for Cell Length Along Line (meters) | 5.0 | 5.0 | 5.0 |
| Minimum Cell Size (expressed as no. of std. deviations along line) | 8 | 8 | 8 |
| Std. Deviation for Fixed Mine Line Width (meters) | 6 | 6 | 6 |
| Random Mine Line Width (expressed as no. of std. deviations) | 8 | 8 | 8 |
| Fixed Mine Line Width (expressed as no. of std. deviations) | 8 | 10 | 15 |

*Fig. 10*

TABLE II
IMPROVED Pd FROM ALGORITHM PREDICTIONS

| Sensor Pd | Algorithm Augmented Pd |
|---|---|
| 0.4 | 0.84 |
| 0.6 | 0.95 |
| 0.9 | 0.99 |

*Fig. 11*

TABLE III
FAR INCLUDING TARGETS PREDICTED BY PSAT

| Sensor FAR | Algorithm Augmented FAR |
|---|---|
| 1 | 4.07 |
| 2 | 4.00 |
| 5 | 4.14 |
| 10 | 4.31 |
| 15 | 5.83 |
| 20 | 7.46 |

*Fig. 12*

NONPARAMETRIC MINE LINE DETECTION USING SPATIAL ANALYSIS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The present invention relates to a method for detecting mines, and in particular to a method of improving a sensor's probability of detection performance and the sensor's probability of false alarm performance.

2. Prior Art

Parametric methods index (or label) individual distributions within a particular family. For example, there are an infinite number of normal distributions, where each normal distribution is uniquely determined by its mean and standard deviation. If one specifies all of the parameters (here, mean and standard deviation), then a unique normal distribution is specified. Statistical techniques are properly called parametric where they involve estimating or testing the value(s) of parameter(s)—usually, population means or proportions. In contrast nonparametric methods are procedures that work without reference to specific parameters.

Nonparametric procedures can be based on ranked data. Data are ranked by ordering them from lowest to highest and assigning them, in order, the integer values from 1 to the sample size.

For large samples, nonparametric techniques can be viewed as the usual normal-theory-based procedures applied to ranks. For smaller sample sizes, the same statistic (or one mathematically equivalent to it) is used, but decisions regarding its significance are made by comparing the observed value to special tables of critical values.

Mine field sensor systems utilize a plurality of sensors to search, classify and map (SCM) contacts in mine fields. The contacts can be mines or false alarms. A method that improves the analysis of a minefield as to the determination of contacts as to whether the detected contacts are mines or false alarms is needed. Furthermore, improved spatial descriptions of the mine lines are needed, where it is particularly advantageous if the analysis can be applied across the board to sensor systems having differing levels of performance, and the improvement requires no knowledge of either the sensor probability of detection ($P_d$) or probability of false alarm ($P_{fa}$).

SUMMARY OF THE INVENTION

The invention is a method, a mine sensor system, and a computer program product, that includes a computer usable medium having a computer readable program code embodied therein, where the computer readable program code is adapted to be executed to implement a method for enhancing the detection of mines and mine lines using an algorithm that employs probabilistic spatial analysis of targets (PSAT). The algorithm uses the spatial distribution of detected objects to determine the likelihood of mines present. The invention provides a list of targets likely to be mines rather than false alarms, a list of detected mine-lines, and identifies unsearched areas likely to have mines present. The apparatus typically is inclusive of or in communication with a mine sensor. The mine SCM-sensor system identifies mine-like contacts (MLCs), as well as their physical location in a minefield. The algorithm classifies every MLC into one of three classes: fixed—the MLC fits into a mine line pattern with fixed mine spacing; random—the MLC fits into a mine line pattern with random mine spacing; or false alarm—the MLC does not fit into a mine line pattern and is subsequently not considered a mine.

The probabilistic spatial analysis of targets includes: 1) calculating the probability that the observed number of targets occurred randomly in the mine line region formed by the two candidate points; 2) analyzing statistically significant anomalies to classify a mine line as either fixed-spaced or random; 3) extending the line appropriately to capture any targets that fall on either side of the line due to incorrect end point selection; and 4) as the mine line detection proceeds, using bookkeeping protocols to keep track of the MLC classifications.

Advantages of the invention include: the invention does not require knowledge of the sensor's probability of detection performance nor knowledge of the sensor's probability of false alarm performance, and the invention accommodates, if available, the confidence values that the detected targets are mines. The invention extends detected mine lines, when appropriate, and confidence values are typically provided from Computer-Aided Detection & Classification algorithms (CAD/CAC). The invention creates and utilizes a novel determination of the probability that an anomalous mine count is from a fixed-spaced mine line.

BRIEF DESCRIPTION OF THE DRAWINGS AND TABLES

The foregoing invention will become readily apparent by referring to the following detailed description and the appended drawings in which.

Figure 5:
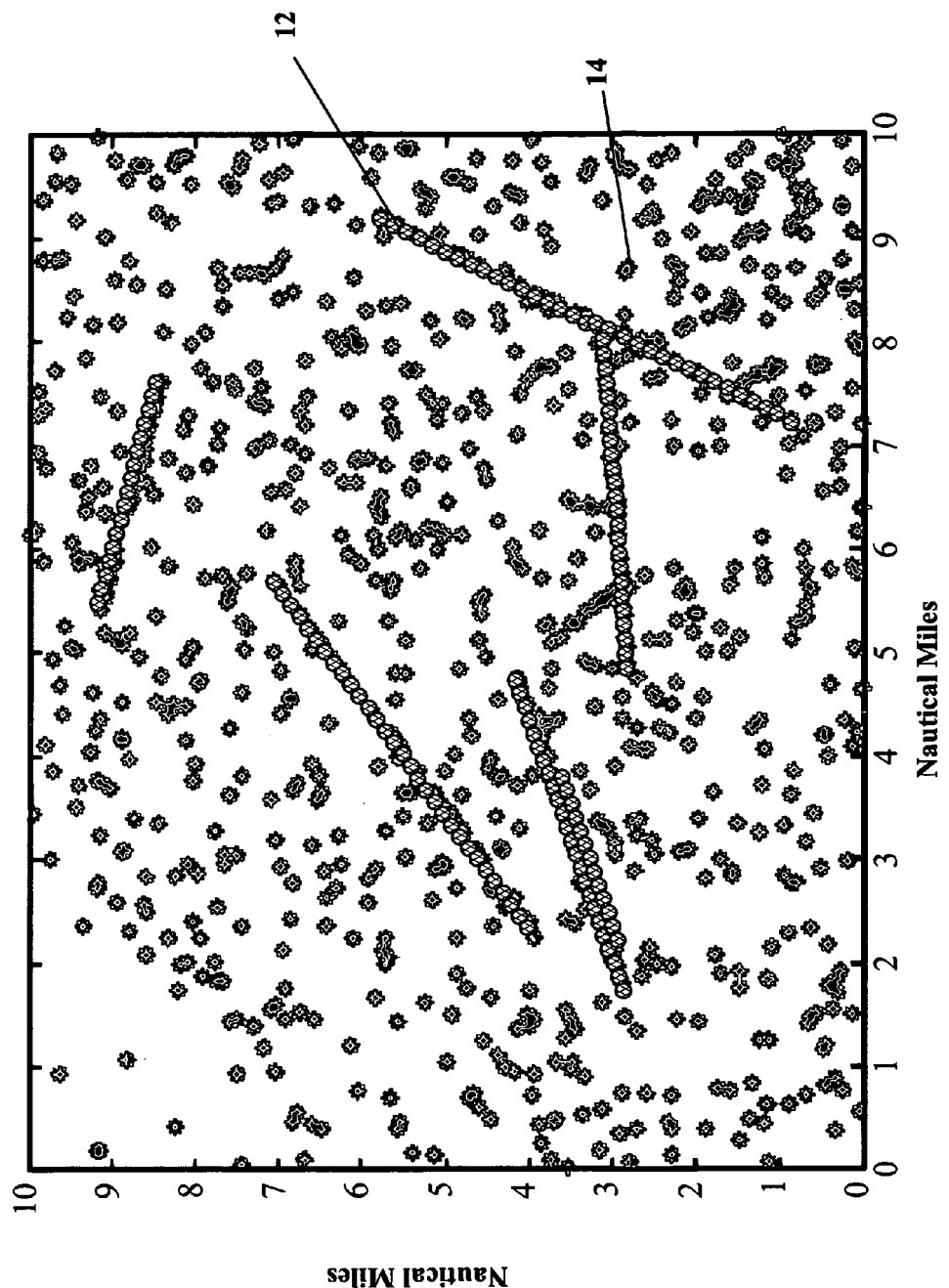
FIG. 5 illustrates the PSAT solution of FIG. 3 showing identified mine lines 12 and false alarms 14.
Figure 6:
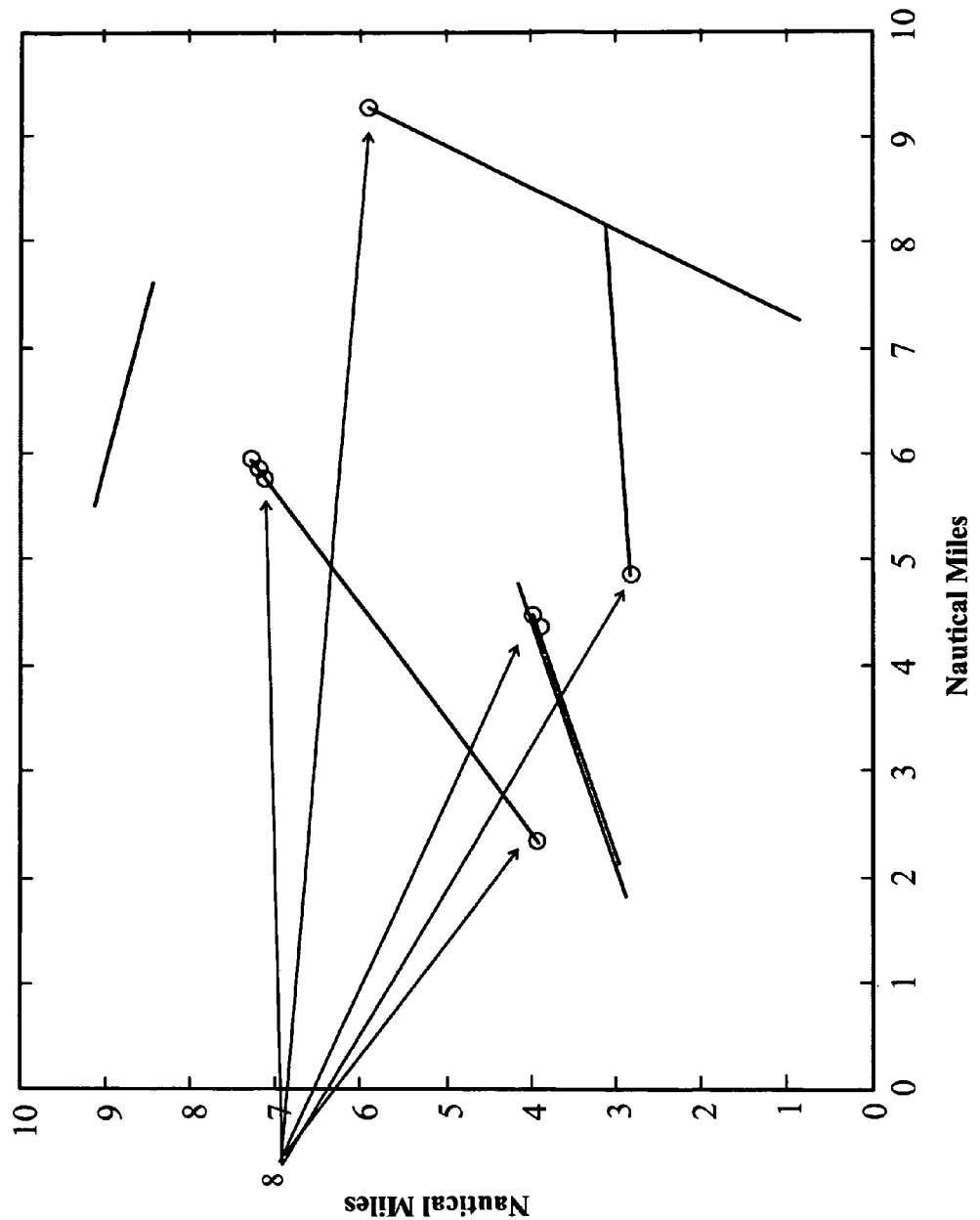
Figure 7:
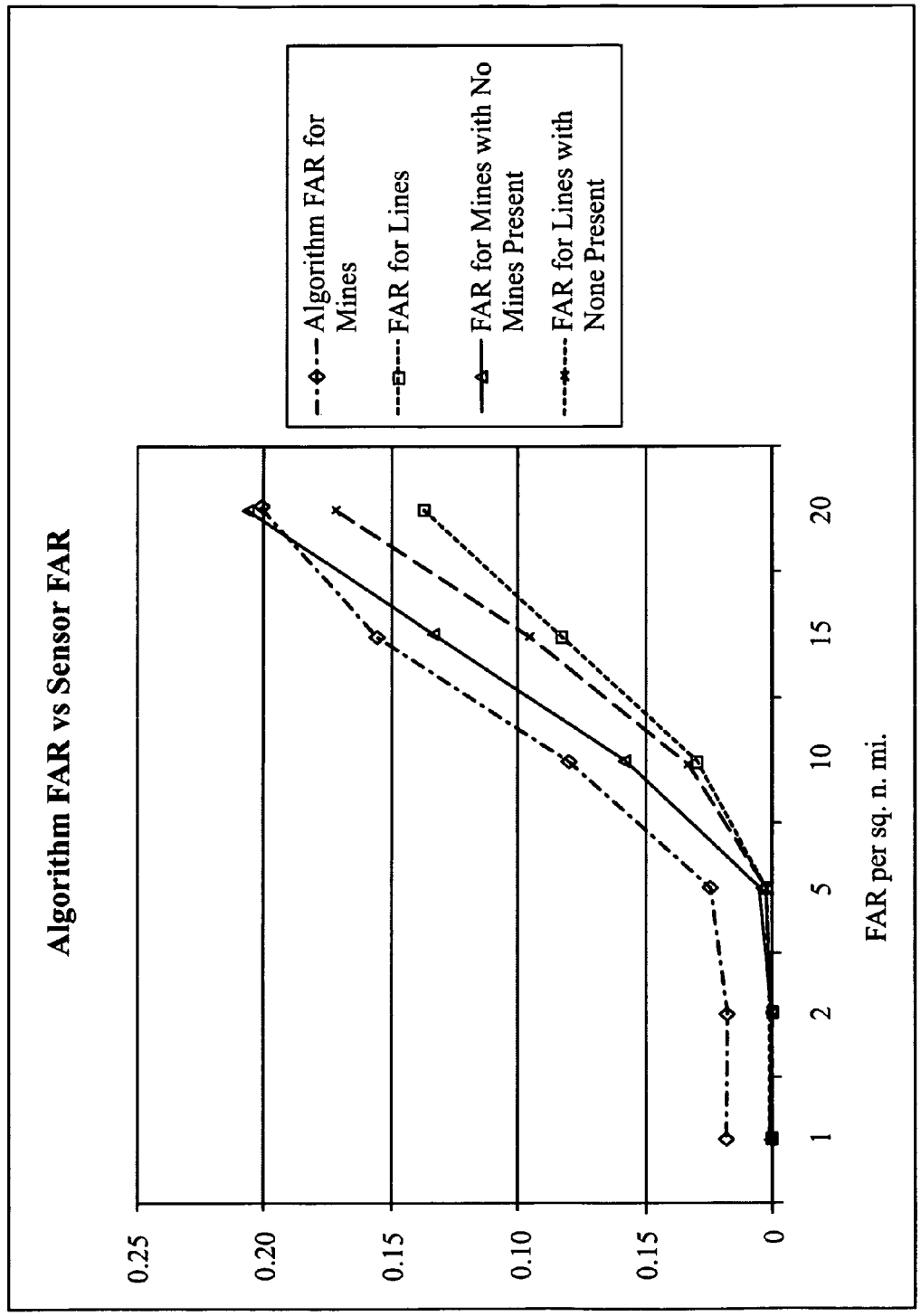
Figure 8:
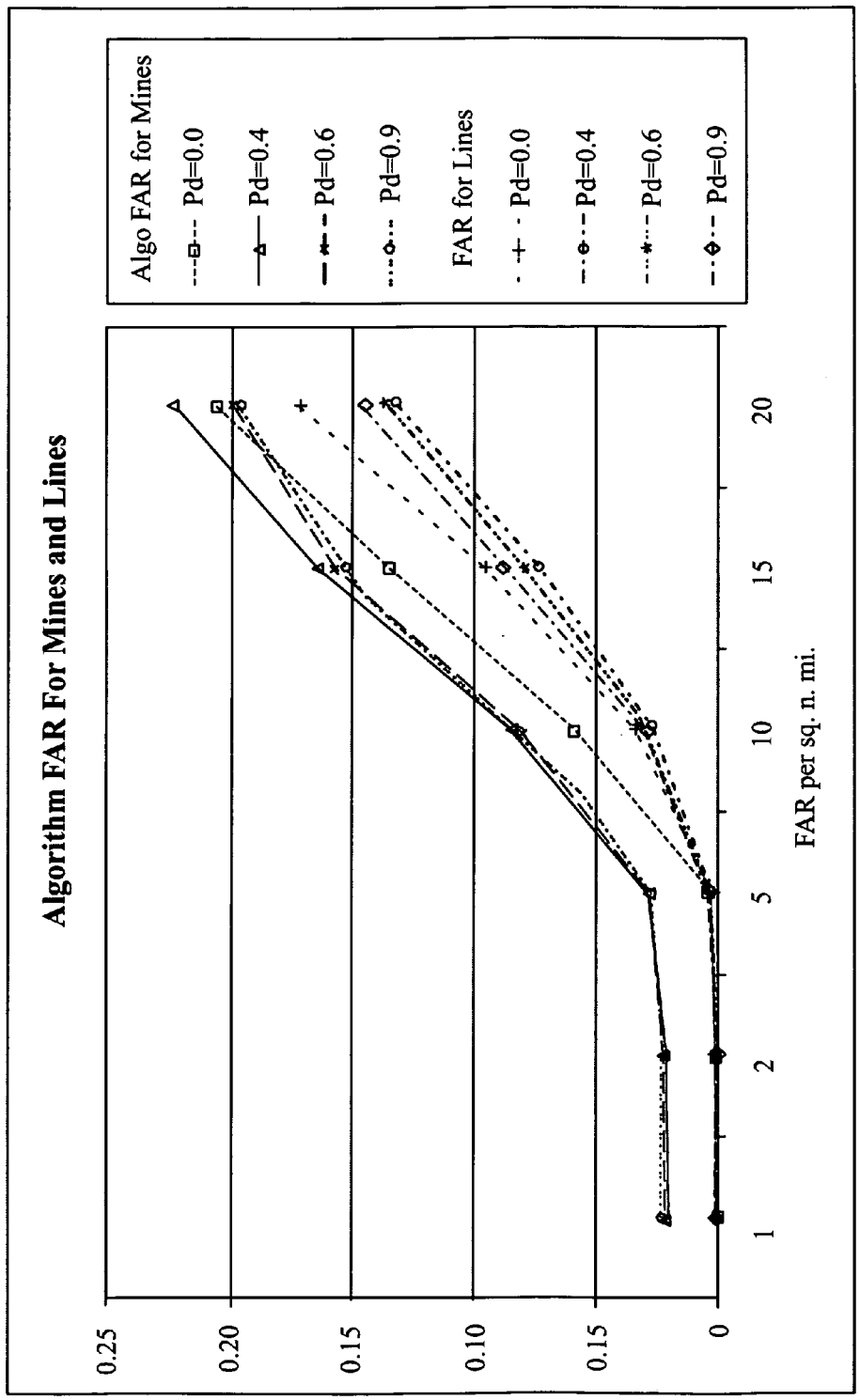
Figure 9:
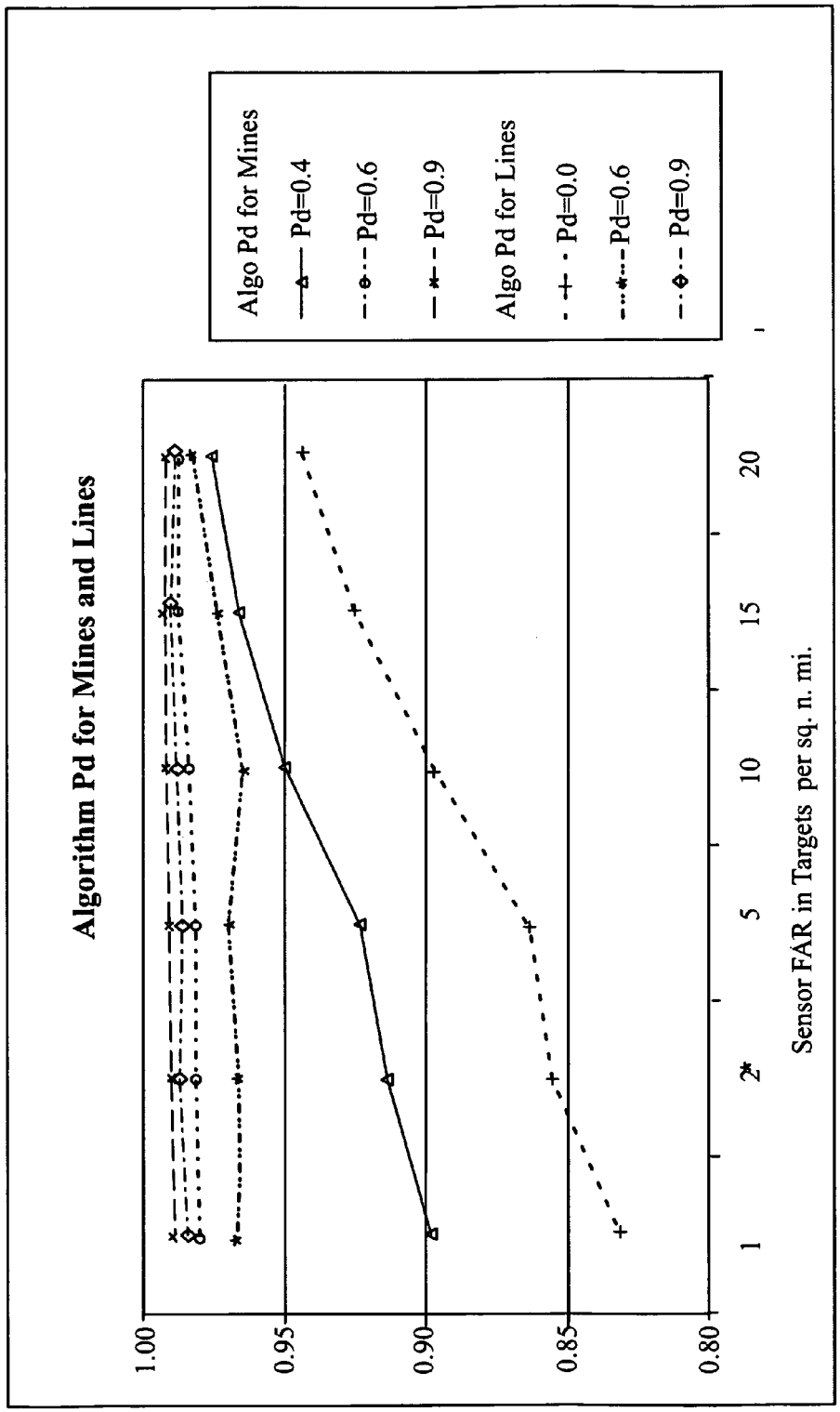

FIG. 6 identifies the eight mines that were neither detected by the SCM sensor nor predicted by the PSAT solution displayed in FIG. 5;

FIG. 7 is a plot of the algorithm's false target rate versus that of the sensor, where the Y axis algorithm's FAR for mines refers to the number of sensor-detected targets on the X axis that are incorrectly marked as mines by the algorithm;

FIG. 8 graphically illustrates the algorithm FAR result for individual sensor performance levels;

FIG. 9 graphically illustrates the rate at which the algorithm confirms mine detections as well as its rate of detection for mine lines, where the algorithm's detection rate is virtually constant over all sensor false target rates, and as expected, when the sensor's detection rate falls, the mine patterns become more difficult to detect;

FIG. 10 is a list of parameters as a function of depth used in analyzing the minefield;

FIG. 11 is a sensor system's performance as measured by its prediction rate, and the same sensor system's performance when PSAT is allowed to predict undetected mines; and FIG. 12 shows the FAR for mines when PSAT is allowed to predict undetected mines, where false detections lie nearly co-linear to established lines, either fixed or random, therein generating suspected mine positions matching the established pattern. Also, false targets will occasionally obscure the true mine spacing making it appear smaller. This results in too many predicted mine locations.

DETAILED DESCRIPTION OF THE INVENTION

The invention in one aspect is a methodology that enhances the performance of an apparatus that searches, classifies and maps (SCM), such as a minefield sensor system having the capability of classifying mine-like contacts (MLCs) and detecting mine lines.

The methodology employs probabilistic spatial analysis of targets (PSAT). Nonparametric anomaly analysis first identifies regions with unusually high MLC density for more detailed analysis, then PSAT is used to screen all possible mine lines. The analysis includes calculating the probability that the observed number of targets (e.g. mines, mine-like contacts) occurred randomly in a mine line region formed by two candidate points (P0,P1).

Second, statistically significant anomalies are then further analyzed to classify the mine line as either fixed-spaced or random. Fixed-spaced mine lines are characterized by spatial features, in that with fixed-spaced mine lines the distance between mines is substantially fixed, and fixed-spaced mine lines do not intersect. This spatial characterization is derived largely because of navigational constraints on a water-borne vessel when laying a minefield using a ship. An air-borne vessel is not so constrained, and mine lines can intersect.

Third, once PSAT (probabilistic spatial analysis of targets) concludes that a candidate target pair does in fact form a mine line of known type, PSAT then extends the line appropriately to capture any targets that fall on either side of candidate line due to incorrect end point selection.

Finally, as the mine line detection proceeds, various bookkeeping protocols keep track of the MLC (mine-like contacts) classifications. Regression analysis can be used to fine tune the end point selection.

First, the Initial Area Analysis selects two candidate points. The pair of candidate points spatially define a line, where each point correlates to a position of a detected target (MLC) on a target list. The target list is typically generated by the SCM-sensor system, however other sources can contribute to this list, and the source of the target list is not limited to the SCM-sensor system. The pair of points represents candidate endpoints of a mine line. If N is the number of detections, $N*(N-1)/2$ is the number of unique endpoint pairs (i.e. 4 points has 6 possible unique endpoint pairs, 5 points has 10 possible unique endpoint pairs). To reduce the number of pairs for consideration all pairs closer than a minimum line length or farther apart than a maximum length are removed. The initial area analysis then evaluates those remaining pairs as candidate endpoints to a mine line.

In the analysis the minimum mine line length is a product estimated by taking the minimum mine spacing parameter for a fixed-spaced mine line and multiplying it by a minimum number of mine cells required to form a mine line. A mine cell in the illustrated embodiment is a rectangular area immediately surrounding a spatially specific target. The product gives the minimum length line that a selected algorithm can analyze. The maximum length is read from the parameter file. The maximum size is not the upper limit of detectable lines, but rather a means of limiting the number of potential target pairs in the pool of candidate end points. The initial estimate of the likelihood that the targets (P0,P1) are an available pair of targets on a segment of the same mine line is a function of the number of detections that lie on or near the line between the pair (P0,P1) and the number of detections in a similar adjacent comparison area.

Figure 1:
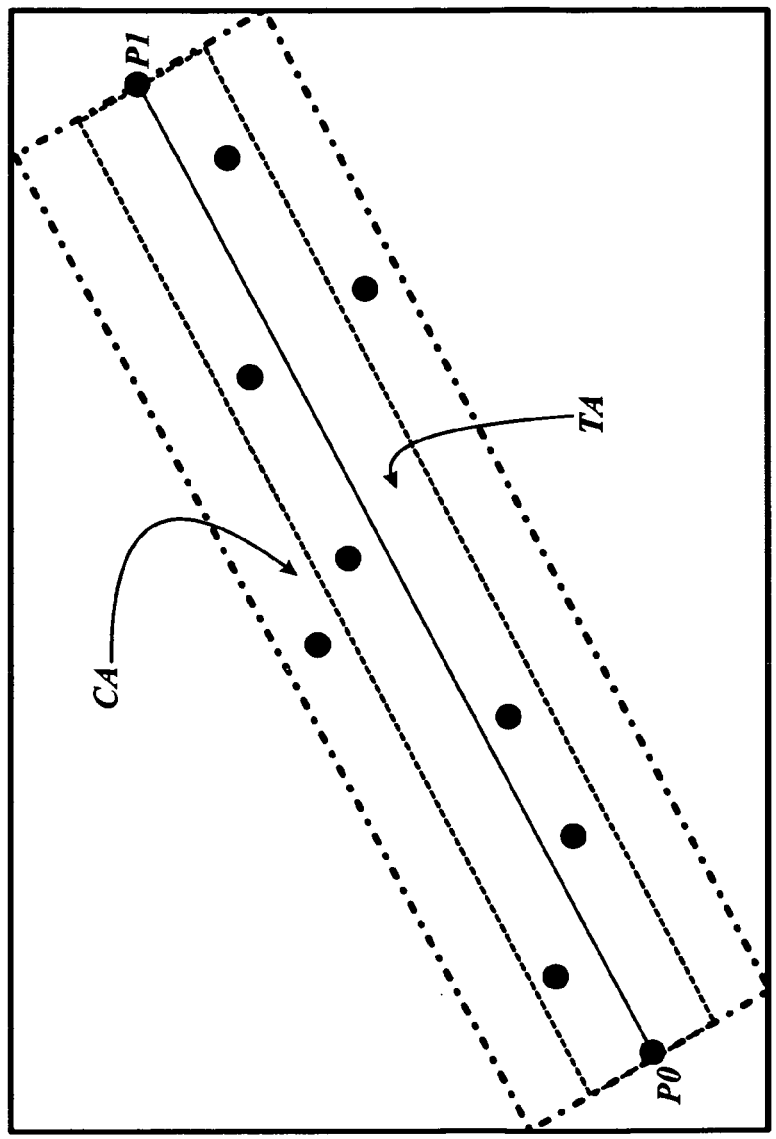
FIG. 1 is a diagrammatic view of a portion of a minefield described by the outer dashed line that illustrates a Test Area (TA) described by the inner dashed line, and a Comparison Area (CA) described by the area between the inner and the outer dashed lines, for a Candidate Pair (P0, P1)

FIG. 1 shows the defined test area (TA) of a mine line region containing the line segment (P0, P1) and the adjacent comparison area (CA). The width of the test area (TA) is chosen based on the provided position errors and the predicted error in the original placement of the targets. This chosen width is derived from the assumed navigational errors with some extra consideration given for slightly nonlinear mine configurations. These values are in the parameter file for a given depth. For the initial test the larger random mine line standard deviation is used to define the test area size (see Table 1—Random Mine Line Width expressed as number of standard deviations). The comparison area (CA) is adjacent to a test area (TA) and both areas have the same size. Because the test and comparison areas are adjacent, it is reasonable to assume that they have a similar environment and therefore a similar but unknown false target rate. It follows that if no mines are present, and the observed targets are all false alarms uniformly distributed in the test and comparison areas, that since the areas are the same size, the probability that one of the observed false targets lies in the test area is one half.

Additionally, PSAT calculates the probability of randomly obtaining a target count in the test area (TA) that is smaller than the observed value. This probability calculation is the binomial cumulative distribution function and is calculated using the binomial probabilty cumulative distribution function with the following parameters: probability p equal to one half; N, the total number of false targets equal to the observed target count in the test area (TA) plus the observed target count in the control area (CA); and k, observed false target count in the test area (TA). These calculations are performed for each available pair of mine line end points. The pairs with the highest probability of obtaining a count smaller than the observed count are identified. If this probability, referred to as BestCT, is less than or equal to a predetermined cutoff value, for instance 0.95, then no pairs are likely candidates for mine line members. The remaining pairs that exceed BestCT are now considered candidate mine lines. From all the identified candidate pairs that exceed BestCT, the ones with the largest value k are selected first for further analysis. Larger k values are evidence that a pair is more likely to be a mine line. Therefore, this helps insure that the best pairs are examined first. At this point in the analysis there are still quite a few pairs in the list for consideration and many of these pairs have identical k values. When a k value tie exists, the pair in the list whose points form the longest line are examined first. Therefore, if two candidate pairs have the same number of intervening targets k, then the candidate pair with the longest line is examined first, albeit this is not a limitation. Contact confidence values provide a probability that a target is in fact a mine and are sometimes available. When contact confidence values are available in addition to counts, the calculations become more complicated, depending on the target count. For small target counts (15 or less) the method can simply enumerate every possible outcome of total target confidence scores inside the test area. Since the scores of false targets should be randomly assigned, the method can use the list to calculate the statistical likelihood of observing a score sum as large as the total score for targets within the test area from false targets alone.

For larger target counts it is not practical to list every possible outcome. Instead, to account for the target scores, the sum of scores inside the test area is normalized by the mean score over both areas (TA and CA). This has the effect of biasing the count in cases where a large number of relatively high confidence targets lie in one area or the other. In practice, for the large count case, the target scores add little value to the calculation. This is not unexpected as these are, for the most part, simply sums of independent identically distributed random variables with finite variance and are therefore very well behaved. The binomial distribution is used to calculate the probability of obtaining the observed scores from false targets alone. The value assigned to each pair is the probability of obtaining a target count less than that observed. Note, if this value is large, it indicates that there are too many targets between the members of the pair to be a purely random occurrence, and therefore are mines.

At this point in the analysis, there is enough information to estimate a posterior probability (likelihood*prior probability), where the posterior probability confirms that the best candidate pair of points defines a mine line. Recall, the highest probability of obtaining a count smaller than the observed count is BestCT; then the probability of a target count as large as that observed, given that there is no mine line, is 1−BestCT. Since mine lines are likely to contain many mines, we assume that it is highly probable that a mine line would have a target count as large as the observed (detected by SCM-sensor system or supplied from another source). For the prior probability that a randomly chosen pair of points fall on the same line we use a conservative estimate of 0.05. The prior probability, which was based on the line defined by the initial point pair (P0,P1) could be improved with information about likely mine line positions, accurate false target rate estimates, or accurate mine count estimates. In summary, we now have $$p(X|\text{no mine line}) = 1 - \text{BestCT} \quad (1)$$

$$p(X|\text{mine line}) = 1 \quad (2)$$

$$p(\text{mine line}) = 0.05 \quad (3)$$

where X equals target count in test area.

From these the probability of the observed count is $$p(X) = p(X|\text{mine line})p(\text{mine line}) + p(X|\text{no mine line})(1 - p(\text{mine line})) \quad (4)$$

If p(X) is non-zero then $$p(\text{no mine line}|X) = p(X|\text{no mine line})[1 - p(\text{mine line})]/p(X) \quad (5)$$

Calculating the posterior probability results in $$p(\text{mine line}|X) = 1 - p(\text{no mine line}|X) = 0.05/(1 - 0.95\text{BestCT}) \quad (6)$$

If the value for p(mine line|X) is greater than the minimum probability, $p_{min}$, defined in the parameter file for the current depth (see Table 1), the pair in question is likely to define a mine line. Otherwise, another candidate pair of points is selected for analysis.

As previously enumerated the posterior probability confirms that a candidate pair of points defines a mine line. The requirements for confirmation includes a detailed probability analysis by PSAT. The PSAT analysis evaluates all possible intra-mine spacings. To evaluate all possible intra-mine spacings requires a number of values derived from the various target counts and positions; including determining a Count, where the Count is the number of contacts in the random mine line area between P0 and P1 (TA in FIG. 1); determining a CountSmall, where the CountSmall is the number of contacts in the fixed mine line test area between P0 and P1; determining a Expmaxgap, where Expmaxgap is the largest distance along the line between any two contacts in the random line region; and determining a SumSmall, where the SumSmall is the sum of the confidence scores of targets within the fixed mine line test area.

The analysis characterizes detected anomalies, and classifies the mine line as a random mine line, a fixed-spacing mine line, or upon further analysis, the method could eliminate it from consideration. As fixed spacing mine lines provide the most information, the first step is to try to find a spacing for the mines. The range of possible mine spacing for the current depth is given in the parameter file (see Table 1). The spacing parameters widen as the depth of the minefield increases. For under 40 feet the minimum mine spacing is 20 meters and the maximum is 120 meters, for 40 to 100 feet the range is 70-300, and for 100 to 200 feet the range is 150 to 610. Note, the mine spacing ranges overlap. Currently the spacing is assumed to be uniformly distributed over all possible values. The reader is reminded that there are 3.28 feet in a meter. More exotic distributions can be used if they are available.

Figure 2:
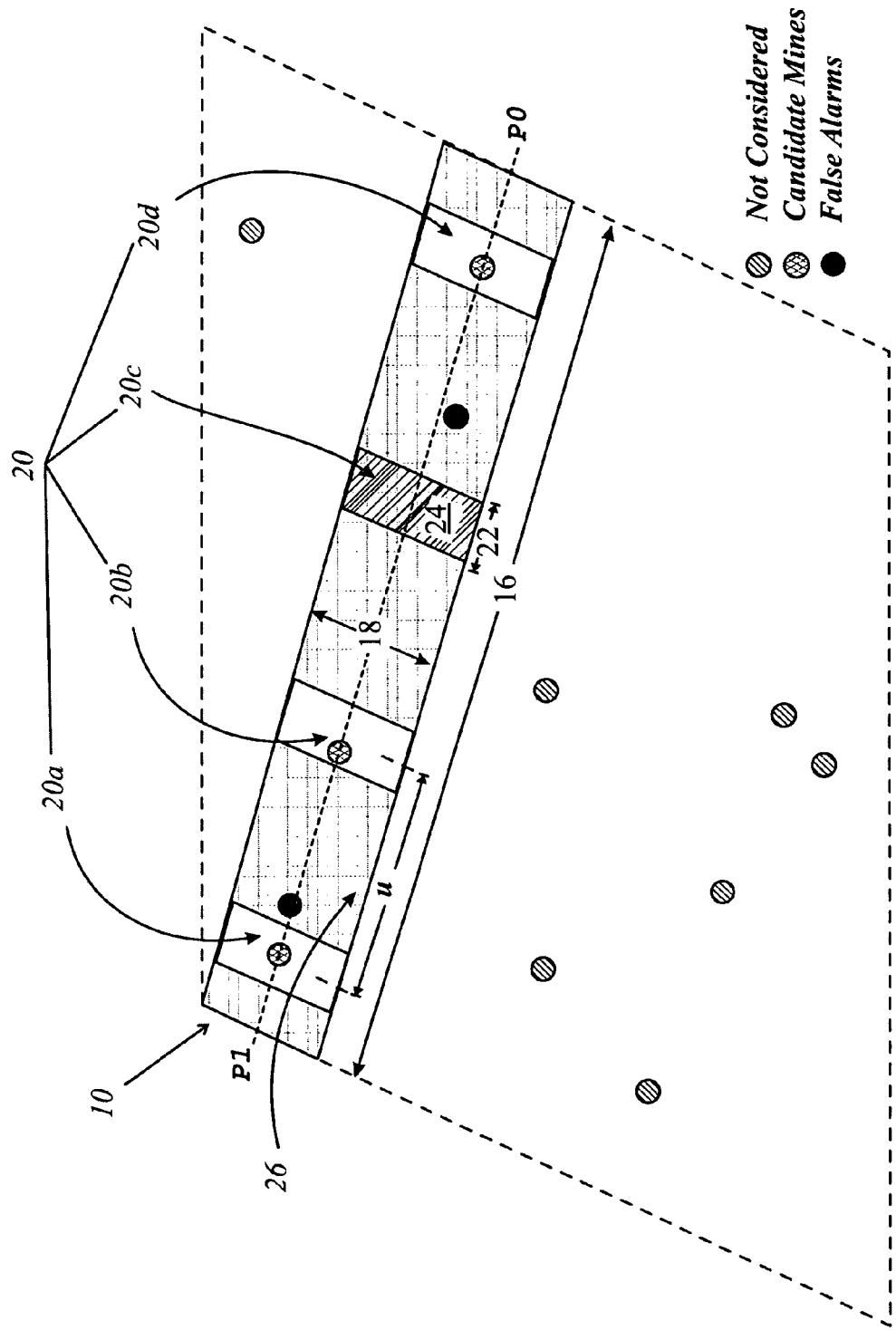
FIG. 2 is a diagrammatic view of a portion of a minefield with a mine line with a mine line cell structure, where some targets are mines, some are false alarms, and some are not considered—depending on their position relative to the mine line cells aligned along the mine line.

Referring to FIG. 2, the candidate mine line 10 has a length 16 and a width 18. The illustrated candidate mine line length 16 is defined by the points P0 and P1. Assuming P0 and P1 are mines in a line with fixed spacing, within a defined positioning error, there are only a finite number of possible values for, μ, where μ is the distance between consecutive targets along the mine line. Let dp0p1 be the distance between P0 and P1. Then, ignoring positioning error, dp0p1 is an integer multiple of μ. Since the minimum and maximum values of μ are known, there are upper and lower bounds for the integer:

$$N\text{max} \leq dp0p1/(\text{minimum } \mu) \text{ and}$$

$$N\text{min} \geq dp0p1/(\text{maximum } \mu) \quad (7)$$

The true value of μ must be of the form dp0p1/n for n between Nmax and Nmin, inclusive. Note, only a minimum value of μ is required to guarantee that only finitely many values are possible.

In this case the originally planned spacing for the mine line would exactly match a member of the above set very infrequently because deployment of mines is imprecise and they will move around slightly after being deployed. However, it must be within the error in positioning for P0 and P1 combined with the error in the SCM-sensor system system's estimate of the position of P0 and P1. This is addressed by expanding the allowable positions for the intermediate targets. Targets from fixed-spacing lines are considered to lie in 'cells' 20. Four cells 20a,20b,20c,20d are shown. The size of these cells is defined in the input parameter file for the current depth. In Table 1 the rectangular cell dimensions (length 22 and area 24—shown in hatching) of the cell 20 are expressed in relative terms of the standard deviation of the mine line length 16. Using relative dimension terms accommodates for the depth. The cell size is chosen to account for the original target positioning errors and the errors on the measured positions.

As shown in FIG. 2, the fixed spacing mine line between P0 and P1 should have a mine in each cell and no mines outside of cells. Due to undetected mines and false alarms, this situation would rarely be directly observed. Therefore, the posterior probability of a fixed-spaced line is calculated using the current observations as illustrated. For each possible value of μ, the methodology determines the number of cells (Ncells) in the mine line; the number of cells containing contacts (NcellsWithMines); the sums of the confidences for the highest confidence target in each cell, in case more than one target lies in a cell (CellsConfSum); and the number of contacts not falling onto cells (NFalseAlarms).

Typically the next step would be to calculate the probability of the observed counts given the true value of μ. This, however, requires knowledge of the SCM-sensor system's performance. The questions of what is the probability of detecting NcellsWithMines targets from Ncells, and what is the probability of NFalseAlarms over the area of interest, require knowledge of the SCM-sensor system's sensor Probability of Detection (Pd) and False Alarm Rate (FAR) rates. Given those values it would be possible to sum over all possible combinations of mines and false targets to calculate the exact probability of the observed counts given the various spacings. To limit the need for this prior information, a relatively weak assumption is made: given that this is a mine line, more mines will be detected within the cells than false targets. The stated requirements for a fixed-spacing mine line are then used to devise a measure for comparison of the possible μ's using the available data/observations.

In the invention, there is more than one approach to determine the most probable value for μ. Given the number of filled cells for a given μ, there is the probability of randomly choosing a contact and finding it within a cell, and the probability of randomly choosing a cell and finding a contact in it. The probabilities for success for these two Bernoulli experiments are given by the measure of how well the cells cover the contacts:

$$NcellsWithMines/CountSmall \quad (8)$$

and the measure of how well the targets fill the cells:

$$NcellsWithMines/Ncells \quad (9)$$

Neither of these equations 8, 9 alone captures both the requirements for the perfect μ: to cover all the targets and fill all the cells. Since both requirements are necessary and since when conditioned on the value of NcellsWithMines, the Bernoulli trials described above are independent; the product of the two measures does capture both the requirements:

$$\frac{(NcellsWithMines)^2}{(CountSmall)(Ncells)} \quad (10)$$

In practice, taking the square root of Equation 10 is used to better shape the function so that it behaves well near 1.0; this result is used when confidence scores are unavailable. When contact confidence scores are available, Equation 10 is modified accordingly to produce the final value given in Equation 11.

$$P*[\mu|X] = \frac{\sqrt{(NcellsWithMines)(CellsConfSum)}}{\sqrt{(Ncells)(SumSmall)}} \quad (11)$$

which is formed by replacing the fraction of mines covered by cells by the fraction of the mine scores in cells. The square root is added to modify the behavior near 1. Though not a true probability measure, this function is adequate for comparisons. It ranges from 0.0 to 1.0. In practice, if the pair under consideration belongs to the same fixed spacing mine line, P*[μ|X] is relatively large for one μ, less for a few of its multiples that share a subset or superset of its cells, and practically zero for the rest. The value P*[μ|X] is calculated for each μ and used to determine the most likely spacing. In the rare case of a tie, the largest μ is selected. The value of P*[μ|X] for this μ is used in calculations as P[fixed|X,mine line], the probability of a fixed line given the observations and the presence of some type of mine line.

After the most likely choice for μ is selected, the number of cells in the candidate mine line can be deduced. Also, the number of filled cells can be observed. Recall that all cells are identical in length and width; furthermore, the conditions under which the SCM sensor observed all of the cells in the mine line are assumed to be identical. Therefore, it is reasonable to assume that the probability (pd) of the SCM sensor detecting a mine in any of the cells (for the current mine line) is the same for all of the cells and the probability of detecting a false alarm (pfa) in any of the cells is the same. Under these assumptions, the distribution of filled cells is a combinatoric problem. One of the largest issues for the mine line analysis is the accidental combination of multiple lines. This is characterized by an unusually large gap between targets somewhere along the line. Letting C(a,b) represent "combinations of a objects taken b at a time", the probability of obtaining at least one gap between targets as large as MaxGap given that there are Ncells possible target locations and NcellsWithMines are filled is given in equation (12).

$$P[MaxGap] = (Ncells - MaxGap + 1) \cdot C(Ncells - MaxGap, NcellsWithMines)/C(Ncells, NcellsWithMines) \quad (12)$$

The P[fixed|X,mineline] value is used with P[MaxGap] to determine the likelihood that P0 and P1 define a fixed spacing mine line. If P[fixed|X,mineline] is greater than pmin, defined in the parameter file, and P[MaxGap] is greater than pgap, also defined in the parameter file, then the posterior probability of a fixed line is given in Equation 13.

$$P[fixed|X] = P[fixed|X,mineline]] \cdot P[mineline|X] \quad (13)$$

Thus the posterior probability of a random line is $$P[random|X] = P[mineline|X] - P[fixed|X] \quad (14)$$

If either P[MaxGap] or P[fixed|X,mineline] is too small, or if there were no valid μ's for analysis, then the method assigns all the mine line probability to the randomly spaced mine line case.

$$P[random|X] = P[mineline|X]. \quad (15)$$

The posterior probability is then used to determine the classification of the mine line. If the line fails to be classified, the only modification to the target list is that the tested pair is removed from the list of available pairs. In this case there is no need to recalculate the probabilities for each available pair. If there is another pair in the list of available pairs with a sufficiently large score, the analysis begins again with the new pair. If no such pair remains, the analysis is complete.

It is unlikely that the P0 and P1 from the initial line detection are the actual endpoints of the classified mine line 10. Therefore, in the invented method PSAT attempts to extend detected mine lines based on the likelihood of random targets falling into the mine line pattern.

For fixed-spaced lines, if the identified value for μ is in fact the exact value applied to the entire length of the line, the error bounds used in the original cells would be adequate for the extension. However, μ is just an estimate. Though the estimate is probably close to correct for the segment between P0 and P1, more room for error is needed as the line extends past those two candidate end points. For the extension the length and width of the mine cells are doubled to account for errors in the choice of μ and small errors in the slope of the line.

As in the original line analysis, a temporary change of variable is applied to the target list by shifting and rotating coordinates so that the line between P0 and P1 lies on the horizontal axis with P0 at the origin. The shifting and rotating coordinates enables a nonparametric analysis. Now, all rotated targets to the left of P0 or to the right of P1 that lie within the extended error bounds of a predicted mine cell location are identified. One by one these targets are added to the line if their addition does not create an unacceptably large gap between filled cells.

If the SCM sensor system's false target rate and/or probability of detection were well known for the location in question, the limit for this gap could be established by calculating the probability for the waiting time between the last target added and the next target observed. In an effort to minimize the required prior knowledge, observations from the current line are used to determine whether or not targets lying in projected cells along the extended line should be included as part of the classified mine line.

Since the area covered by each projected mine cell is relatively small, the chances of a false target falling within a perimeter area of a projected mine cell are very low. In fact, the total area covered by all cells extended to a significant length is small. It is tempting to simply add any target that falls in a projected mine cell to the line's target list. However, since it is unclear just how far to extend the line, some rules for the extension have been determined. If a sequence of M missed detections in a row was already accepted as part of the line, a new run of M missed targets in the longer wider line with longer cells should not be rejected. Furthermore, since small errors in the calculated μ and the predicted line slope create larger errors in cell placement as the line is extended beyond P0 and P1, the probability that some genuine mine targets may fall outside of their designated cells increases as the line grows. Since the initial maximum gap is known to fall within an acceptable limit, and to avoid the problem of no gaps, the initial maximum observed gap is increased by 2 cells and doubled. Then to allow the limit to grow as the line extends, if the maximum observed gap in the extended region exceeds the previous estimate from the original, un-extended region, the new observed maximum is doubled and the result is the new maximum acceptable gap. This rather ad hoc solution is attractive since the error bound grows with the line, and it is similar to the more rigorous solution used in the random line case.

After all contacts likely to belong to the line through P0 and P1 have been added to the list of targets, an attempt is made to correct the line's slope using linear regression. This is helpful in cases where the mine line is very long and small errors in the slope due to errors in the positions of P0 and P1 result in missed targets in the far range. The correction is also important for the prediction of target positions in unsearched areas.

After correcting the slope, another attempt is made to add targets to the line beyond P0 and P1 and also to any empty cells between P0 and P1. The resulting new target list is then used to again correct the slope using linear regression. The final target list includes all targets lying in μ spaced cells along the corrected line. Each of the final targets are removed from the list for further analysis, and any candidate endpoint pair matched with any member of this list is marked not available to become the next considered (P0,P1).

Before extending a random line, the line's position is corrected using linear regression, and any points between P0 and P1 that fall in the corrected mine line region are included in the target list.

Next, a boundary for the acceptable distance along the random mine line between the current endpoint and a prospective extension point is established. If the unknown Poisson rate for the mines randomly distributed along the line is L and there are N intervals between targets already included in the line, the probability that the maximum distance, $G_N$, between the perpendicular projections of any two consecutive points on the corrected line is less than some x>0 is given by Equation (16).

$$P[G_N <= x] = (1-e^{-Lx})^N \quad (16)$$

The density for $G_N$ is the derivative of this expression and is given by Equation 17.

$$LN(1-e^{-Lx})^{N-1}e^{-Lx} \quad (17)$$

The probability that the next interval will be greater than x is $e^{-Lx}$. The probability that the length of the next interval, $W_{N+1}$ will be at least as large as the maximum of the previous ones is given in the integral shown in Equation 18.

$$P[W_{N+1} >= G_N] = \int_0^\infty e^{-Lx} LN(1-e^{-Lx})^{N-1}e^{-Lx} dx \quad (18)$$
$$= 1/(N+1)$$

Thus, for fairly large values of N, the current maximum interval is a reasonable bound for the size of the next interval. However for small N, something larger is required. For positive integer K, $$P[W_{N+1} >= KG_N] = \int_0^\infty e^{-KLx} LN(1-e^{-Lx})^{N-1}e^{-Lx} dx \quad (19)$$
$$= KP[W_{N+2} >= (K-1)G_{N+1}]/(N+1)$$

Solving recursiving $$P[W_{N+1} >= KG_N] = N!K!/(N+K)! \quad (20)$$

For K=2, this is 2/[(N+1)(N+2)] which is acceptable even for N as small as four. Therefore, the maximum gap allowed between the endpoint and a new contact to be added is twice the maximum gap between targets over all targets accepted as part of the current line.

As in the fixed-spacing case, targets are added one by one to the line starting at the initial endpoints P0 and P1. At each step the distance between the current endpoint and the prospective target is compared to twice the maximum gap between targets currently accepted into the line.

After the random line has reached its maximum extent, the position of the line is again corrected using linear regression using both the original points and those added in the extension. Any points within the random line's corrected boundaries are added to the line's target list. In the random case, there is no additional information to distinguish false targets and mines. Therefore, all contacts within the line's error bounds must be marked as mines. And all of these targets are then removed from the target list for analysis and all remaining target pairs with a member in the random line are marked not available.

Once a line has been classified, some housekeeping is required. For a fixed spacing line, targets lying in the cells for the identified spacing are assumed to be mines associated with the current line. Hence, they are removed from further consideration as either a mine line end point or a member of another mine line's cells. Contacts not in cells are assumed to be either false targets or mines from intersecting lines. As such these targets are left for further analysis. For randomly distributed lines it is impossible to distinguish between mines from the current line, false targets, and mines from intersecting lines. Thus, all targets within the defined error bound of the line segment between P0 and P1 are assumed to be members of the current line. All pairs including any of these contacts are removed from the available pairs list, and all these contacts are removed from the target list for consideration.

Since the target list and the list of available pairs has changed, all available pairs must be re-evaluated before another pair can be chosen for analysis. A flag is set to insure that a new BestCT is calculated and a new set of best pairs is identified. Once a line has been found and its targets are removed from consideration, the number of available pairs can be greatly reduced. However, since the target list is modified, the probability of obtaining the new observed count within the test area for each available pair must be recalculated. Thus the entire initial area analysis is repeated on the reduced data set. With each iteration, the number of candidate endpoint target pairs is reduced and less time is required for the analysis.

The method is complete when all MLCs have been analyzed. The mine sensor system having a prediction rate of about 0.4 to about 0.6 is improved utilizing the invented method to about 0.84 to about 0.95.

Example 1

Figure 3:
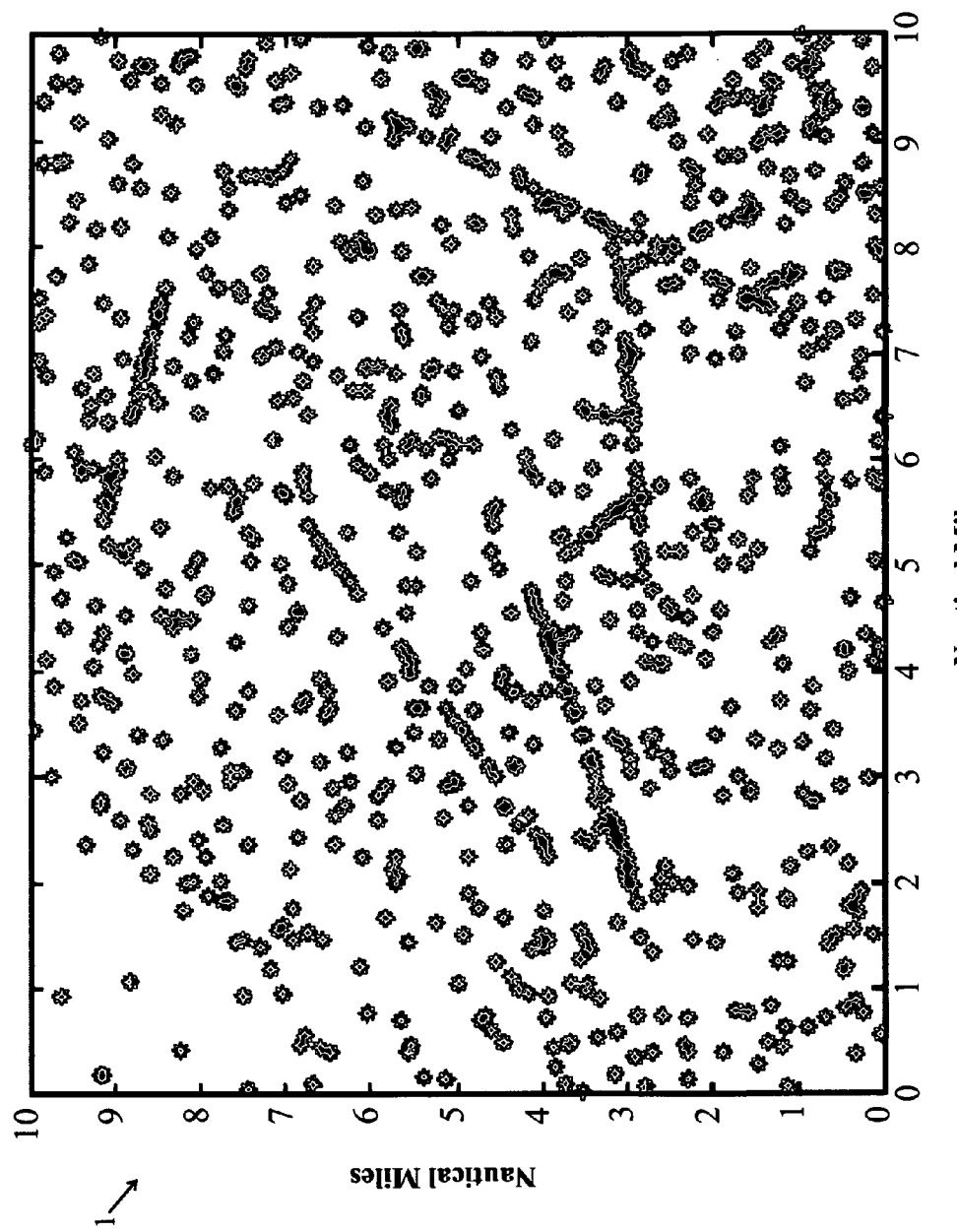
FIG. 3 is a simulated example of original mine-like contact (MLC) locations reported by a MLC sensor using a SCM-sensor system (SCM=search, classify and map) searching over a 10 nautical mile by 10 nautical mile square region.

FIG. 3 shows a simulated example of original mine-like contact (MLC) locations reported by a MLC sensor using a SCM-sensor system (SCM=search, classify and map) searching over a 10 nautical mile by 10 nautical mile square region. Several mine lines are visible to the naked eye. The simulated minefield 1 contains 940 MLCs consisting of 133 detected mines in six fixed-spaced mine lines and 807 false targets. Detections that do not fall onto any of these lines are false alarms. The algorithm detects mine line patterns by performing a probabilistic spatial analysis of targets (PSAT). The algorithm accepts target detections from any ATR or operator contact list, complete with any available target confidence assessments. In addition to identifying mine lines and reducing false target rates, the PSAT algorithm identifies probable mine locations missed by the detection sensor.

Figure 4:
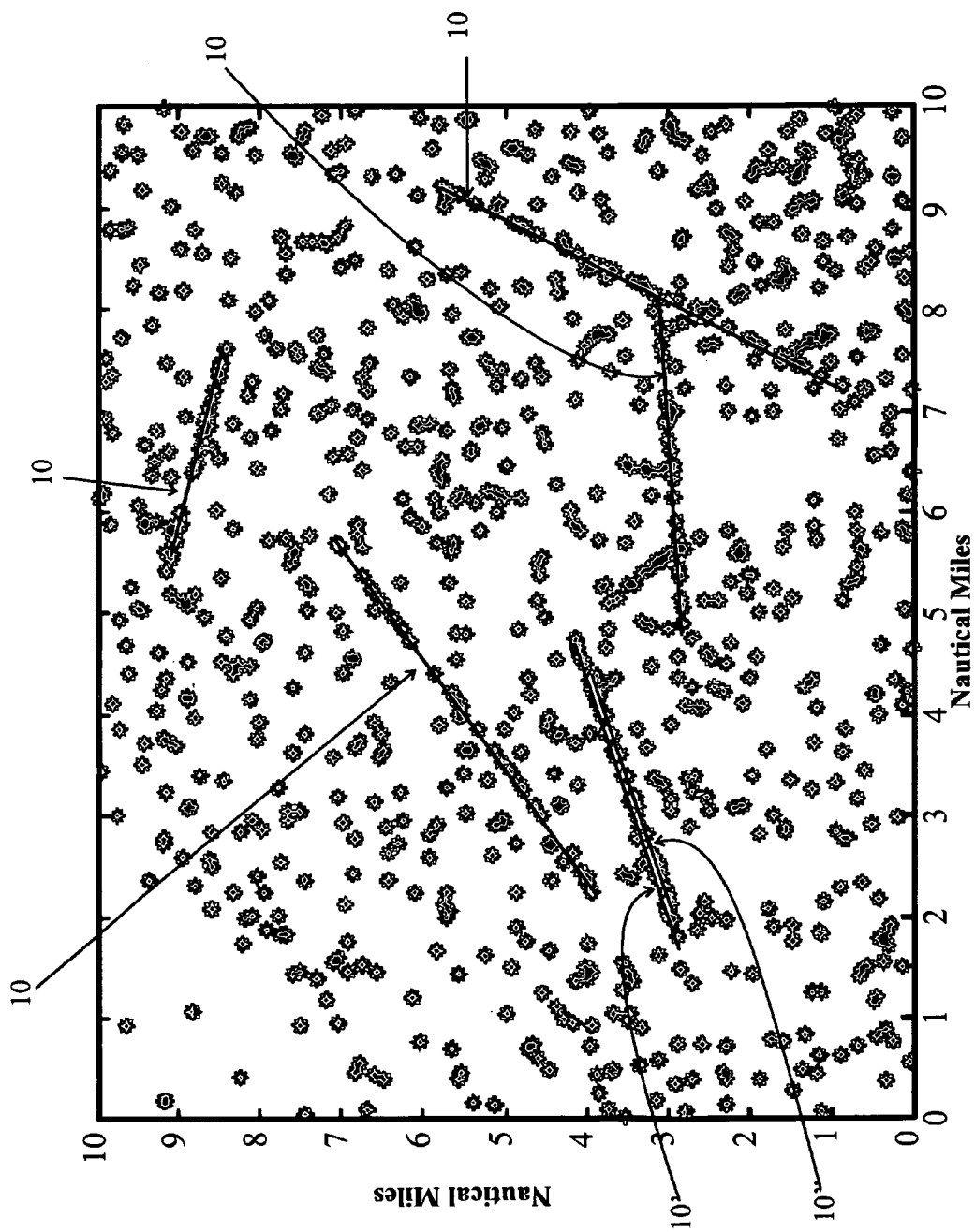
FIG. 4 is FIG. 3 with the true mine line solution, there are six mine lines.

FIG. 4 shows the six true mine lines in the simulated minefield. Note that two mine lines 10', 10" in the lower left portion of the simulated minefield are very close together.

FIG. 5 shows the results of applying the PSAT algorithm to the detections in FIG. 4. The PSAT algorithm correctly identifies all six mine lines (item 12) with no false line detections. Additionally, the PSAT algorithm has correctly predicted the locations of 74 missed mines by the detection sensor with only 7 false predictions.

In FIG. 6 the circles 8, represent eight mines that were not predicted by PSAT, but were included in the true solution in FIG. 4.

The performance of the PSAT algorithm has been tested in a Monte Carlo simulation over a variety of minefield and sensor parameters. 1,367 different minefield scenarios were simulated. The simulations included 3 depths: 10 ft., 60 ft, and 200 ft.; 6 false alarm rates (FARs) from 1 to 20 contacts per sq.n.mi.; 3 false target distributions; 3 sensor $P_d$'s: 0.4, 0.6, and 0.9; true target confidence scores 0.6, 0.8, and 1.0; and false target confidence scores 0.5, 0.6, 0.8, and 1.0. Each scenario was replicated 10 times. The simulations were used to measure the algorithm's $P_d$ and FAR for both mines and mine lines under various conditions. All mines in the simulations were in nearly linear or piecewise linear structures with either fixed or random mine spacing.

FIG. 7 shows a plot of the algorithm's false alarm rate vs. that of the sensor. The algorithm's FAR for mines refers to the number of sensor-detected targets that are incorrectly marked as mines by the algorithm per square nautical mile. The FAR for lines refers to the count of false lines detected per square nautical mile. This number is a bit less straightforward as line length is not considered. These values are shown for both scenarios, with and without mine lines present. Pd=0.0 indicates the case when no mine lines are present. Note that the algorithm greatly reduces the number of false targets even in cases where the sensor FAR is as high as 20 per square nautical mile.

FIG. 8 graphically shows the algorithm FAR result for individual sensor performance levels. Note there is little variation in the algorithm FAR over the various sensor performance levels. Though the algorithm significantly lowers the sensor false target rate, it has only a small negative effect on the sensor's probability of detecting a mine.

FIG. 9 graphically shows the rate at which the algorithm confirms mine detections as well as its rate of detection for mine lines. It is interesting to note that for sensor Pd values at least as large as 0.6, the algorithm's detection rate is virtually constant over all sensor false target rates. And as expected, when the sensor's detection rate falls, the mine patterns become more difficult to detect. For sensor Pd=0.4, the detection rate for mines is as low as 83% while the detection rate for lines is 90%. These rates do increase as the sensor and algorithm false target rates rise even for very low sensor Pd's.

The probabilities of detection for mines and the FAR for mines referenced above are for results restricted to the original sensor contact lists. In the case of a fixed spacing mine line, it is possible for the algorithm to predict the location of undetected mines. This raises both the probability of detection for mines and the FAR for mines. Table 2 shows the resultant Pd when the PSAT is allowed to predict undetected mines.

Unfortunately, algorithm target predictions are not perfect. Sensor false detections that happen to lie nearly co-linear to established lines, either fixed or random, can result in spurious line extensions. In the fixed-spaced line case, the algorithm will generate suspected mine positions matching the established pattern. Also, false targets will occasionally obscure the true mine spacing making it appear smaller. This results in too many predicted mine locations. Table 3 shows the FAR for mines when PSAT is allowed to predict undetected mines.

Alternatives to the invention include utilizing detection data from search areas that are incompletely searched by the sensors. Under these circumstances, the probability for the Bernoulli trial in the initial anomaly detector is adjusted for the actual sizes of the test area searched and the comparison area searched. Additionally, the number of cells (Ncells) is scaled by the proportion of the actual area searched.

The invention is as a mine sensor system includes: i) one or more minefield sensors interfaced to a computer; ii) a computer program product; iii) a simulated or actual minefield that follows rules for deploying mines by both water borne vessels and airborne vessels, where the minefield fits into mine line patterns dictated by standard mine laying protocol; and iv) a processor to characterize the mine sensor system's performance across a wide range of operating environments (depth of water) and simulated minefield configurations, and to develop parameters (i.e. Table I) for mine lines, cell size and a minimum number of cells.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A method of augmenting a mine sensor system, said method comprising:

reading a list of mine-like contacts (MLCs) generated by the mine sensor system or a device in communication with the mine sensor system, where a mine-like contact occupies a position within an area having a depth of water that is known at least approximately, where a MLC is a candidate target;

identifying regions with unusually high MLC density for more detailed analysis;

selecting a pair of candidate targets having a number of intervening candidate targets, said candidate targets having positions which are two candidate end points that spatially define a line that potentially could be a mine line with a mine line region, and the number of intervening candidate targets could be members of the mine line region;

using probabilistic spatial analysis of the targets (PSAT) to determine the probability of obtaining a count of targets in the mine line region formed by the two candidate points at least as large as the observed value given the target count in an adjacent control area, and to analyze statistically significant anomalies to classify a mine line as either fixed-spaced or random;

extending the line and correcting the slope, iteratively, to capture any MLCs from the list that fall in the line region and adjusting for imprecise end point selection;

using bookkeeping protocols to keep track of the MLC classifications as the mine line detection proceeds, where each of the targets falls into one of three classes:
a) fixed, where the MLC fits into a mine line pattern with a fixed mine spacing;
b) random, where the MLC fits into a mine line pattern with random mine spacing; or
c) false alarm, where the MLC does not fit into a mine line pattern and is subsequently not considered a mine;

classifying mine lines as either fixed-spaced mine lines or random-spaced mine lines, where fixed-spaced mine lines never intersect and have fixed spacing between MLCs; and selecting another pair of candidate targets from the list, and repeating the analysis until the list is exhausted.

2. The method according to claim 1 further comprising a list of parameters as a function of depth, wherein the parameters are used in the analysis of the minefield.

3. The method according to claim 1, wherein the mine line pattern with a fixed mine spacing has a minimum mine spacing parameter and a maximum mine spacing parameter.

4. The method according to claim 1, wherein the mine line has a mine line cell structure, said mine line cell structure having cells aligned and equally spaced along the mine line, where a cell has a mine unless there is a gap.

5. The method according to claim 4, wherein the cell is rectangular and has a minimum cell size expressed as the number of standard deviations along the mine line.

6. The method according to claim 5, wherein the line has a minimum number of cells of five.

7. The method according to claim 1, wherein the random mine line has a width expressed as a number of standard deviations.

8. The method according to claim 1, wherein the fixed-spaced mine line has a width expressed as a number of standard deviations.

9. The method according to claim 1, wherein the mine sensor system having a prediction rate of about 0.4 to about 0.6 is improved utilizing the invented method to about 0.84 to about 0.95.

10. A non-transitory computer program product, that includes a computer usable medium having a computer readable program code embodied therein, where the computer readable program code is adapted to be executed to implement a method for the enhancing the detection of mines and mine lines using an algorithm that employs probabilistic spatial analysis of targets (PSAT), wherein the method comprises:

reading a list of mine-like contacts (MLCs) generated by the mine sensor system or a device in communication with the mine sensor system, where a mine-like contact occupies a position within an area having a depth of water that is known at least approximately, where a MLC is a candidate target;

identifying regions with unusually high MLC density for more detailed analysis;

selecting a pair of candidate targets having a number of intervening candidate targets, said candidate targets having positions which are two candidate end points that spatially define a line that potentially could be a mine line with a mine line region, and the number of intervening candidate targets could be members of the mine line region;

using probabilistic spatial analysis of the targets (PSAT), a posterior probability confirms that the number of targets that occurred randomly in the mine line region formed by the two candidate points is much smaller than the observed target count in a test area of the mine line region, and the PSAT statistically analyzes significant anomalies to classify a mine line as either fixed-spaced or random;

extending the line and correcting the slope, iteratively, to capture any MLCs from the list that fall in the line region and adjusting for imprecise end point selection;

using bookkeeping protocols to keep track of the MLC classifications as the mine line detection proceeds, where each of the targets falls into one of three classes:
a) fixed, where the MLC fits into a mine line pattern with a fixed mine spacing;
b) random, where the MLC fits into a mine line pattern with random mine spacing; or
c) false alarm, where the MLC does not fit into a mine line pattern and is subsequently not considered a mine;

classifying mine lines as either fixed-spaced mine lines or random-spaced mine lines, where fixed-spaced mine lines never intersect and have fixed spacing between MLCs; and selecting another pair of candidate targets from the list, and repeating the analysis until the list is exhausted.

11. The computer program product according to claim 10, wherein the posterior probability confirms that the best candidate pair of points defines a mine line when there is a count of targets of five or more.

12. The computer program product according to claim 10, wherein the PSAT analysis evaluates all possible intra-mine spacings, and determine the most probable value for the intra-mine spacing, assuming that more mines than false targets will be detected within cells, where the line has a mine line cell structure, said mine line cell structure having cells aligned and equally spaced along the mine line, where a cell has a mine unless there is a gap.

13. The computer program product according to claim 10, wherein the posterior probability of a fixed-spaced line is $P[fixed|X] = P[fixed|X, mineline]] \cdot P[mineline|X].$ 14. The computer program product according to claim 10, wherein the posterior probability of a random line is $P[random|X] = P[mineline|X] - P[fixed|X].$ 15. The computer program product according to claim 10, wherein linear regression is applied after extending the line to correct the line's slope.

16. The computer program product according to claim 10 further comprising an actual minefield.

17. The computer program product according to claim 10, wherein a maximum gap allowed between the endpoint and a new contact to be added to a random spaced mine line is determined to be twice the maximum gap between targets over all targets accepted as part of the current line.

18. A mine sensor system comprising:
   i) one or more minefield sensors interfaced to a computer;
   ii) a non-transitory computer program product, that includes a computer usable medium having a computer readable program code embodied therein, where the computer readable program code is adapted to be executed to implement a method for the enhancing the detection of mines and mine lines using an algorithm that employs probabilistic spatial analysis of targets (PSAT), wherein the method comprises:
   reading a list of mine-like contacts (MLCs) generated by the mine sensor system or a device in communication with the mine sensor system, where a mine-like contact occupies a position within an area having a depth of water that is known at least approximately, where a MLC is a candidate target;
   identifying regions with unusually high MLC density for more detailed analysis;
   selecting a pair of candidate targets having a number of intervening candidate targets, said candidate targets having positions which are two candidate end points that spatially define a line that potentially could be a mine line with a mine line region, and the number of intervening candidate targets could be members of the mine line region having a mine line cell structure;
   using probabilistic spatial analysis of the targets (PSAT), a posterior probability confirms that the number of targets that occurred randomly in the mine line control region formed by the two candidate points is much smaller than the observed target count in a test area of the mine line region, and the PSAT statistically analyzes significant anomalies to classify a mine line as either fixed-spaced or random;
   extending the line and correcting the slope, iteratively, to capture any MLCs from the list that fall in the line region and adjusting for imprecise end point selection;
   using bookkeeping protocols to keep track of the MLC classifications as the mine line detection proceeds, where each of the targets falls into one of three classes:
      a) fixed, where the MLC fits into a mine line pattern with a fixed mine spacing;
      b) random, where the MLC fits into a mine line pattern with random mine spacing; or
      c) false alarm, where the MLC does not fit into a mine line pattern and is subsequently not considered a mine;
   classifying mine lines as either fixed-spaced mine lines or random-spaced mine lines, where fixed-spaced mine lines never intersect and have fixed spacing between MLCs; and
   selecting another pair of candidate targets from the list, and repeating the analysis until the list is exhausted
   iii) a simulated or actual minefield that follows rules for deploying mines by both water borne vessels and airborne vessels, where the minefield fits into mine line patterns dictated by standard mine laying protocol; and
   iv) a processor to characterize the mine sensor system's performance across a wide range of operating environments (depth of water) and simulated minefield configurations, and to develop parameters for mine lines, cell size and a minimum number of cells.

* * * * *